(12) United States Patent
Sato

(10) Patent No.: US 9,712,693 B2
(45) Date of Patent: Jul. 18, 2017

(54) INFORMATION PROVISION APPARATUS, INFORMATION PROVISION METHOD, AND NON-TRANSITORY STORAGE MEDIUM

(71) Applicant: NEC Corporation, Minato-ku, Tokyo (JP)

(72) Inventor: Yoshiaki Sato, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 14/420,423

(22) PCT Filed: Apr. 11, 2013

(86) PCT No.: PCT/JP2013/002490
§ 371 (c)(1),
(2) Date: Feb. 9, 2015

(87) PCT Pub. No.: WO2014/027433
PCT Pub. Date: Feb. 20, 2014

(65) Prior Publication Data
US 2015/0222781 A1  Aug. 6, 2015

(30) Foreign Application Priority Data
Aug. 15, 2012 (JP) ................. 2012-180208

(51) Int. Cl.
*G06F 3/00* (2006.01)
*G06F 3/01* (2006.01)
(Continued)

(52) U.S. Cl.
CPC ......... *H04N 1/00251* (2013.01); *G06F 3/005* (2013.01); *G06F 3/017* (2013.01);
(Continued)

(58) Field of Classification Search
None
See application file for complete search history.

(56) References Cited

U.S. PATENT DOCUMENTS 7,069,516 B2 *  6/2006  Rekimoto ............. G06F 3/0317
715/757
7,818,419 B1  10/2010  McAllister et al.
(Continued)

FOREIGN PATENT DOCUMENTS

JP    2001-229154 A    8/2001
JP    4256850 B2       8/2006
(Continued)

OTHER PUBLICATIONS

Tomohiro Nakai et al., "Real-Time Document Image Retrieval Based on Local Arrangements of Feature Points and Its Application to Augmented Reality", IEICE Technical Report, Sep. 1, 2006, vol. 106, No. 229, pp. 41 to 48, cited in the ISR with English Abstract.
(Continued)

*Primary Examiner* — Justin P Misleh

(57) ABSTRACT

Provided is an information provision apparatus (10) including: a feature quantity storage unit (11) in which a feature quantity of print content that is printed on a printed material is stored; a relevant information storage unit (12) in which relevant information that is associated with the print content is stored; a captured image obtainment unit (13) that obtains a captured image that is captured by an imaging unit; a specification unit (14) that specifies the print content that is included in the captured image by using the feature quantity of the print content that is stored in the feature quantity storage unit (11); and a relevant information output unit (15) that obtains from the relevant information storage unit (12) the relevant information that is associated with the print content that is specified by the specification unit (14) and outputs the obtained relevant information.

11 Claims, 12 Drawing Sheets

(51) Int. Cl.

| | | |
|---|---|---|
| *G06K 9/00* | (2006.01) | |
| *G06K 9/20* | (2006.01) | |
| *H04N 1/00* | (2006.01) | |
| *H04N 5/225* | (2006.01) | |
| G06F 17/30 | (2006.01) | |
| G06F 3/14 | (2006.01) | |
| G06F 3/0488 | (2013.01) | |

(52) U.S. Cl.
CPC ..... *G06K 9/00442* (2013.01); *G06K 9/00671* (2013.01); *G06K 9/2081* (2013.01); *H04N 5/225* (2013.01); *G06F 3/04886* (2013.01); *G06F 3/14* (2013.01); *G06F 17/30879* (2013.01)

(56) References Cited

U.S. PATENT DOCUMENTS

| | | | | |
|---|---|---|---|---|
| 2012/0042288 A1* | 2/2012 | Liao | ............ | H04N 1/00129 715/863 |
| 2012/0320092 A1* | 12/2012 | Shin | ............ | G06F 3/0425 345/633 |
| 2013/0063646 A1* | 3/2013 | Ueno | ............ | G03B 21/142 348/333.1 |
| 2013/0147836 A1* | 6/2013 | Small | ............ | G06F 3/011 345/633 |

FOREIGN PATENT DOCUMENTS

| | | | |
|---|---|---|---|
| JP | 4852634 B2 | 3/2011 | |
| JP | WO 2011149092 A1 * | 12/2011 | ........... G03B 21/142 |
| JP | 2012-014606 A | 1/2012 | |
| JP | 2012014606 A * | 1/2012 | |

OTHER PUBLICATIONS

Motoki Kobayashi et al., "Retrieving and Manipulating Digital Information on EnhancedDesk", Lecture Note/Software-gaku 18 Interactive System to Software V, Dec. 20, 1997, 1st edition, pp. 167 to 174, cited in the ISR with English Abstract.

Pierre Wellner, "Intaracting With Paper on the Digitaldesk", Communications of the ACM, Jul. 31, 1993. vol. 36 Issue 7, pp. 87-96, cited in the ISR.

Kimiyoshi Miyata, "Development of Prototype for Museum Guide System Using AR Technology with Projector-Camera System", The Journal of the Institute of Image Electronics Engineers of Japan, Sep. 25, 2011, vol. 40, No. 5, (whole No. 214), pp. 851 to 859, cited in the ISR with English Abstract.

Ronald T.Azuma, A Survey of Augmented Reality, Presence: Teleoperators and Virtual Environments, Aug. 31, 1997, vol. 6 No. 4, pp. 355-385 (1.2 Definition, 3.2 Optical vs. video, 4.4 Vision-based techniques, 7.Conclusion, Figure 15), cited in the ISR.

International Search Report for PCT Application No. PCT/JP2013/002490, mailed on Jun. 4, 2013.

Wakana Suzuki, "Adding Interactivity for Printed Document through Information Projection by Projector", Technical Report of the Institute of Electronics, Information and Communication Engineers (IEICE Technical Report), vol. 111, No. 317, Japan, the Institute of Electronics, Information, and Communication Engineers, Nov. 17, 2011, pp. 69 to 74.

Japanese Office Action for JP Application No. 2014-530460 mailed on Oct. 11, 2016 with English Translation.

* cited by examiner

FIG. 4

| PRINT CONTENT ID | FEATURE QUANTITY | RELEVANT INFORMATION ID |
|---|---|---|
| 000001 | (51,11,134,···73) | MOVING IMAGE 1, CHARACTER STRING 1 |
| 000002 | (21,-59,120,···13) | STILL IMAGE 2 |
| ⋮ | ⋮ | ⋮ |

FIG. 5

| PRINT CONTENT ID | FEATURE QUANTITY | RELEVANT INFORMATION ID | PROJECTION POSITION |
|---|---|---|---|
| 000001 | (51,11,134,⋯73) | MOVING IMAGE 1, CHARACTER STRING 1 | (5.0,1.0),(7.0,1.0) |
| 000002 | (21,−59,120,⋯13) | STILL IMAGE 2 | (5.0,2.0) |
| ⋮ | ⋮ | ⋮ | ⋮ |

FIG. 10

| PRINT CONTENT ID | FEATURE QUANTITY | PAGE NO. | RELEVANT INFORMATION ID | PROJECTION POSITION |
|---|---|---|---|---|
| 000001 | (51,11,134,⋯73) | 1 | MOVING IMAGE 1, CHARACTER STRING 1 | (5.0,1.0),(7.0,1.0) |
| 000002 | (21,−59,120,⋯13) | 2 | STILL IMAGE 2 | (5.0,2.0) |
| 000003 | (65,−149,7,⋯−99) | 3 | STILL IMAGE 3 | (5.0,2.0) |
| 000004 | (2,−72,21,⋯103) | 4 | MOVING IMAGE 4 | (5.0,1.0) |
| 000005 | (−3,29,−17,⋯63) | 5 | CHARACTER STRING 5 | (4.0,2.0) |
| 000006 | (−69,75,97,⋯−41) | 6 | STILL IMAGE 6, CHARACTER STRING 6 | (5.0,1.0),(5.0,3.0) |
| 000007 | (39,238,93,⋯61) | 7 | AUDIO 7 | |
| 000008 | (86,86,199,⋯99) | 8 | MOVING IMAGE 8 | (6.0,1.0) | ized

INFORMATION PROVISION APPARATUS, INFORMATION PROVISION METHOD, AND NON-TRANSITORY STORAGE MEDIUM

This application is a National Stage Entry of PCT/JP2013/002490 filed on Apr. 11, 2013, which claims priority from Japanese Patent Application 2012-180208 filed on Aug. 15, 2012, the contents of all of which are incorporated herein by reference, in their entirety.

TECHNICAL FIELD

The present invention relates to an information provision apparatus, an information provision method, and a program.

BACKGROUND ART

In public facilities or commercial facilities, an attempt to provide information bidirectionally in accordance with a user's interest has been made using a mobile terminal such as a tablet PC or a smartphone.

An interface through which information is projected onto a specific portion of a user's hand, user's possessions, or the like is disclosed in Patent Document 1.

An apparatus operating in conjunction with an external apparatus, which reads a user's gesture, prints virtual information through a printer and provides a user with information, is disclosed in Patent Document 2.

A display control system that detects a marker printed on a printed material using an imaging unit and projects corresponding information onto a floor and the like by the user's directing the marker by a touch operation is disclosed in Patent Document 3.

RELATED DOCUMENT

Patent Document

[Patent Document 1] Japanese Patent No. 4256850
[Patent Document 2] Japanese Patent No. 4852634
[Patent Document 3] Japanese Unexamined Patent Publication No. 2012-014606

DISCLOSURE OF THE INVENTION

However, if interactive information is provided by using the mobile terminal owned by the user, the user needs to perform a predetermined operation, such as photographing a two-dimensional code by using the mobile terminal, reading an NFC tag, or manually inputting a URL. In this case, a problem occurs in that because a user's convenience is impaired, a usage rate is lower.

Furthermore, in the case of the technology disclosed in Patent Document 1, it is difficult to provide a large amount of information because of the unevenness of the user's hand or low contrast.

Furthermore, in the case of the technology disclosed in Patent Document 2, an amount of information can be increased with a simple information provision method that uses a printed material, but this places a burden on the user who gives an instruction using a gesture, and there is a problem in that the user has to wait until the printing is completed.

Furthermore, in the case of the technology disclosed in Patent Document 3, there occur problems of: (1) when the user does not direct the marker, the information is not displayed; (2) a content projection area such as a floor needs to be separately prepared; (3) the marker that is essentially unnecessary for the user occupies a large portion of a paper surface; and (4) a paper medium loses its at-a-glance readability or beauty.

Moreover, the technologies disclosed in Patent Documents 1 and 3 are technologies in which desired information is obtained by the user's operation. In the case of these technologies, the user needs to learn a predetermined operation and this places a burden on the user.

An object of the present invention is to provide a novel information provision apparatus.

According to an aspect of the present invention, there is provided an information provision apparatus including: a feature quantity storage unit in which a feature quantity of print content that is printed on a printed material is stored; a relevant information storage unit in which relevant information that is associated with the print content is stored; a captured image obtainment unit that obtains a captured image that is captured by an imaging unit; a specification unit that specifies the print content that is included in the captured image by using the feature quantity of the print content; and a relevant information output unit that obtains from the relevant information storage unit the relevant information that is associated with the print content that is specified by the specification unit and outputs the obtained relevant information.

According to another aspect of the present invention, there is provided a program for causing a computer to serve as: a feature quantity storage unit in which a feature quantity of print content that is printed on a printed material is stored; a relevant information storage unit in which relevant information that is associated with the print content is stored; a captured image obtainment unit that obtains a captured image that is captured by an imaging unit; a specification unit that specifies the print content that is included in the captured image by using the feature quantity of the print content; and a relevant information output unit that obtains from the relevant information storage unit the relevant information that is associated with the print content that is specified by the specification unit and outputs the obtained relevant information.

According to a further aspect of the present invention, there is provided an information provision method of causing a computer to execute processing including: a captured image obtainment step of obtaining a captured image that is captured by an imaging unit; a specification step of specifying print content that is included in the captured image by using a feature quantity of the print content that is printed on a printed material that is stored in a feature quantity storage unit; and a relevant information output step of referring to a relevant information storage unit in which relevant information that is associated with the print content is stored, obtaining from the relevant information storage unit the relevant information that is associated with the print content which is specified in the specification step, and thus outputting the obtained relevant information.

According to the present invention, a novel information provision apparatus is realized.

BRIEF DESCRIPTION OF THE DRAWINGS

The objects described above, and other objects, features and advantages are further made apparent by suitable exemplary embodiments described below and the following accompanying drawings.

FIG. 4 is a diagram schematically illustrating one example of information that is stored in a feature quantity storage unit according to the present exemplary embodiment.

FIG. 5 is a diagram schematically illustrating one example of information that is stored in a feature quantity storage unit according to the present exemplary embodiment.

FIG. 10 is a diagram schematically illustrating one example of information that is stored in a feature quantity storage unit according to the present exemplary embodiment.

DESCRIPTION OF EXEMPLARY EMBODIMENTS

Figure 1:
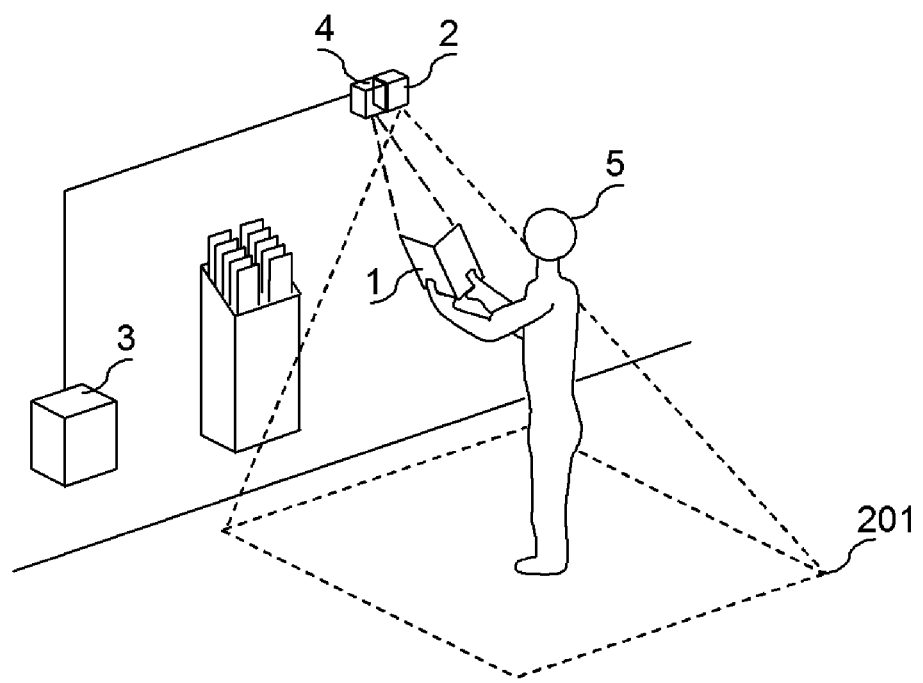
FIG. 1 is a diagram for describing an application example of an information provision apparatus according to the present exemplary embodiment.

Exemplary embodiments of the present invention are described referring to the drawings.

Moreover, an apparatus according to the present exemplary embodiment is realized by a CPU, a memory, a program (including a program installed from a storage medium such as a CD or downloaded from a server on the Internet in addition to a program that is stored in advance within the memory before the apparatus is shipped from a factory) loaded onto the memory, and a storage unit such as a hard drive in which the program is stored, which make up an arbitrary computer, and an arbitrary combination of hardware and software using a network connection interface. It should be apparent to a person of ordinary skill in the art that various modifications to the realized method and apparatus are present.

Furthermore, a functional block diagram that is referred to when the present exemplary embodiment is described illustrates blocks in terms of a functional unit, not a configuration in terms of a hardware unit. Each apparatus on the diagrams is illustrated as being realized by one apparatus, but an apparatus that realizes each apparatus is not limited to this. That is, a configuration in which the apparatus is physically divided may be possible, and a configuration in which the apparatus is logically divided may be possible.

First Exemplary Embodiment

First, the present exemplary embodiment is described in outline.

The information provision apparatus according to the present exemplary embodiment has a configuration in which, print content of the printed material that the user is reading is specified, and relevant information relating to the print content being read is provided to the user.

Here, one example of this is illustrated. As illustrated in FIG. 1, when the user 5 is reading the printed material 1 within a predetermined area 201, an imaging apparatus 2 images the print content printed on the printed material 1 that the user 5 is reading.

Figure 2:
FIG. 2 is a diagram illustrating one example of print content.

The predetermined area 201 may be an area in public buildings, such as a station and an airport, and may be an area in commercial facilities, such as a department store and a shopping mall. The printed material 1 may be, for example, a guide brochure for the station, the airport, or the like, a guide brochure for facilities in the neighborhood of the station, the airport, or the like, or a guide brochure for a commercial facility. As illustrated in FIG. 2, the print content, in which images, characters, and the like are arranged in various layouts, is printed on the printed material 1. The print content may be printed over multiple pages of the printed material 1. Furthermore, the print content may be printed on each one of front and back sides of the printed material 1. Furthermore, the printed material 1 may include multiple printed materials 1, on each one of which different print content is printed. The printed material 1 described above may be disposed in the neighborhood of the predetermined area 201, in order to be read or be distributed.

A feature quantity of the print content that is printed in the printed material 1 is stored in advance in an information provision apparatus 3. Then, when the imaging apparatus 2 images the print content that the user 5 is reading, the print content that the user 5 is reading is specified using the feature quantity of the print content that is stored in advance. Thereafter, the information provision apparatus 3, for example, controls a projection apparatus 4, and projects the relevant information relating to the specified print content on the printed material 1.

Moreover, the projection apparatus 4 can be regarded as one portion of the information provision apparatus 3. Furthermore, the imaging apparatus 2 can be regarded as an apparatus that is different from the information provision apparatus 3, or can be regarded also as one portion of the information provision apparatus 3.

Figure 3:
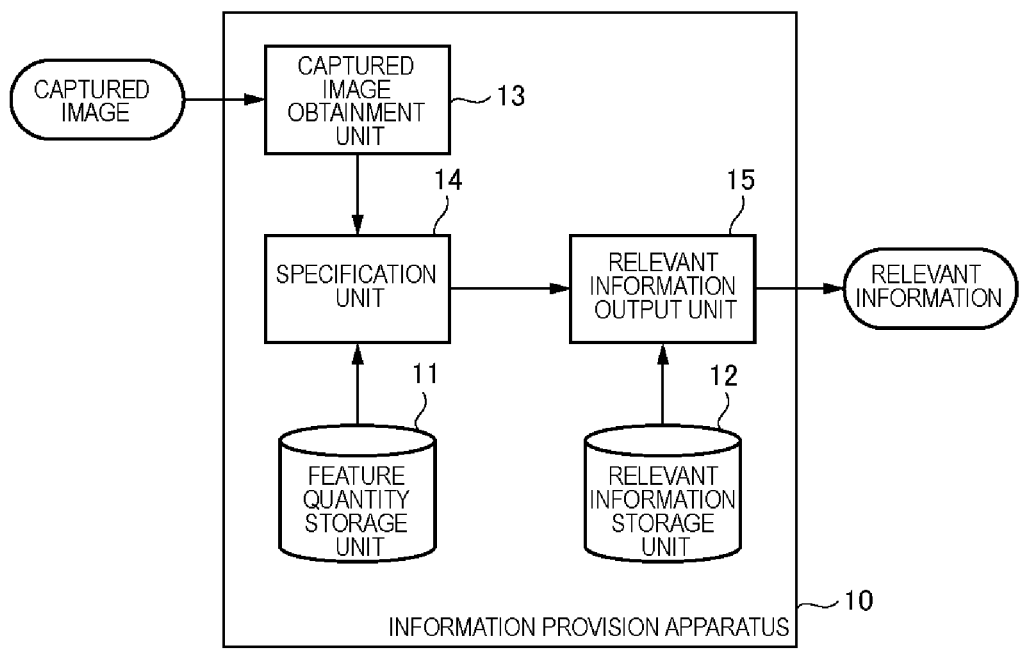
FIG. 3 is a block diagram illustrating one example of a functional block diagram of the information provision apparatus according to the present exemplary embodiment.

A configuration of the present exemplary embodiment is described in detail below. FIG. 3 illustrates one example of a functional block diagram of an information provision apparatus 10 according to the present exemplary embodiment. As illustrated in FIG. 3, the information provision apparatus 10 according to the present exemplary embodiment includes a feature quantity storage unit 11, a relevant information storage unit 12, a captured image obtainment unit 13, a specification unit 14, and a relevant information output unit 15. Each unit is described below.

The feature quantity of the print content that is printed on the printed material 1 is stored in the feature quantity storage unit 11. If the print content is printed on each one of the front and back sides of the printed material 1, the feature quantity of the print content printed on the front side of the printed material 1 and the feature quantity of the print content printed on the back side of the printed material 1 can be stored in the feature quantity storage unit 11, in a manner that distinguishes them from each other. Furthermore, if the printed material 1 includes multiple pages, and the print content is printed over the multiple pages, the feature quantity of the print content is stored in the feature quantity storage unit 11 in a unit of one page or in a unit of two facing pages. In this manner, if multiple items of print content are printed on one printed material 1, the feature quantity of the print content can be stored in the feature quantity storage unit 11 in a unit of pages that the user 5 reads one at a time.

FIG. 4 schematically illustrates one example of information that is stored in the feature quantity storage unit 11. As illustrated, the feature quantity with the feature quantity being associated with a print content ID is stored in the feature quantity storage unit 11. Moreover, like in the illustrated example, an ID (relevant information ID) of the relevant information that is information relating to the print content can be additionally stored with the print content ID.

Referring to FIG. 3, the relevant information that is the information relating to the print content and that is associated with the print content (print content ID) is stored in the relevant information storage unit 12. The relevant information can be a combination of a still image, a moving image, a character string, audio, and the like. Details of the relevant information are a design matter. However, the relevant information on the print content that introduces a restaurant as illustrated in FIG. 2, for example, may be a menu of the restaurant, may be today's recommended menu, may be location information for the restaurant, or may be a moving image that results from imaging the inside of the restaurant.

Referring back to FIG. 3, the captured image obtainment unit 13 obtains the captured image that is captured by an imaging unit (the imaging apparatus 2). The imaging unit is configured from a combination of a visible light camera, an infrared camera, a distance sensor, and the like. It is desirable that the imaging unit be configured to capture an image from above the user 5. In which direction the print content that the user 5 is reading faces depends on the reading posture of the user 5. However, the probability is high that the print content which the user 5 is reading will be facing upward. For this reason, the image is captured from above the user 5, and thus the probability is high that the print content which the user 5 is reading will be imaged. The imaging unit, for example, may be mounted on a ceiling or a wall.

The imaging unit may continue to successively image the predetermined area 201 (refer to FIG. 1), or may continue to successively image the predetermined area 201 only while it is detected with a sensor such as a temperature sensor that the user 5 is present in the predetermined area 201.

The specification unit 14 specifies the print content that is included in the captured image by using the feature quantity of the print content that is stored in the feature quantity storage unit 11. The specification unit 14 can process multiple captured images that are obtained by the captured image obtainment unit 13 for every frame.

The specification unit 14, for example, stores the feature quantities (shape, size, color, and the like) of the printed material 1 itself, and first extracts the printed material 1 from the captured image. Thereafter, the feature quantity of the print content that is printed on the extracted printed material 1 is extracted. No limitation is imposed on a unit that extracts the feature quantity. For example, a method may be used that is robust enough to handle a scale change, or an inclination or rotation (affine transformation), and a partial defect of an image. Such a method is disclosed in the specification of U.S. Pat. No. 6,711,293 or David G. Lowe, "Distinctive image features from scale-invariant key points." (U.S.A), International Journal of Computer Vision, 60(2), 2004, pp. 91 to 110. If such a method is used, even though one portion (one portion of the print content) of a page of the printed material 1 may be hidden by the hand of the user 5, or the print content of which a captured image is being captured is somewhat deformed from the actual print content in terms of an inclination relationship of a direction in which the imaging unit captures an image to a page surface of the printed material 1, pattern recognition can be performed with sufficient accuracy.

After extracting the feature quantity of the print content, the specification unit 14 performs processing that matches the extracted feature quantity and the feature quantity (refer to FIG. 4) that is stored in the feature quantity storage unit 11 to each other. Then, the print content ID is specified, which is associated with the feature quantity that is matched to the extracted feature quantity with a certain precision (which is the design matter). Thereafter, the specification unit 14 specifies the relevant information ID that is associated with the specified print content ID.

Moreover, the specification unit 14 may calculate positional information of the printed material 1 by using the captured image that is captured by the imaging unit. The positional information of the printed material 1 may be expressed using three-dimensional spatial coordinates that specify an origin and x, y, and z axes in real space, may be expressed using a distance to or a direction of the printed material 1 with a position of the imaging unit as a reference, and may be expressed using other units. Because a unit that calculates the positional information is realized in accordance with the technology in the related art, at this point, a description of the unit is not repeated.

The relevant information output unit 15 obtains from the relevant information storage unit 12 the relevant information that is associated with the print content (print content ID) that is specified by the specification unit 14 and outputs the obtained relevant information.

Moreover, as a unit through which the relevant information output unit 15 outputs the relevant information, for example, the following unit is considered. The relevant information output unit 15 may be configured to include a projector and the relevant information may be projected onto the printed material 1. A position of the printed material 1 can be specified by using the positional information of the printed material 1 that is calculated by the specification unit 14. In addition, a screen may be installed in a position in which the user 5 present within the predetermined area 201 can read the relevant information, and the relevant information output unit 15 may project the relevant information onto the screen. Furthermore, a speaker may be installed in such a way that the user 5 who is present within the predetermined area 201 can listen to the audio, and the relevant information output unit 15 may output the audio (relevant information) by using the speaker. Furthermore, a display may be installed in a position in which the user 5 present within the predetermined area 201 can view the relevant information, and the relevant information output unit 15 may display the relevant information on the display.

As a modification example of the present exemplary embodiment, projection positional information indicating a position on the printed material onto which the relevant information is projected may be stored in advance for every piece of relevant information in the relevant information storage unit 12 (refer to FIG. 5). The projection positional information, for example, may be expressed using two-dimensional coordinates with a predetermined position (a corner, a center, and the like) of the printed material 1 as an origin. Then, the relevant information output unit 15 in the modification example may project the relevant information onto a position on the printed material 1 that is specified with the projection positional information.

Figure 7:
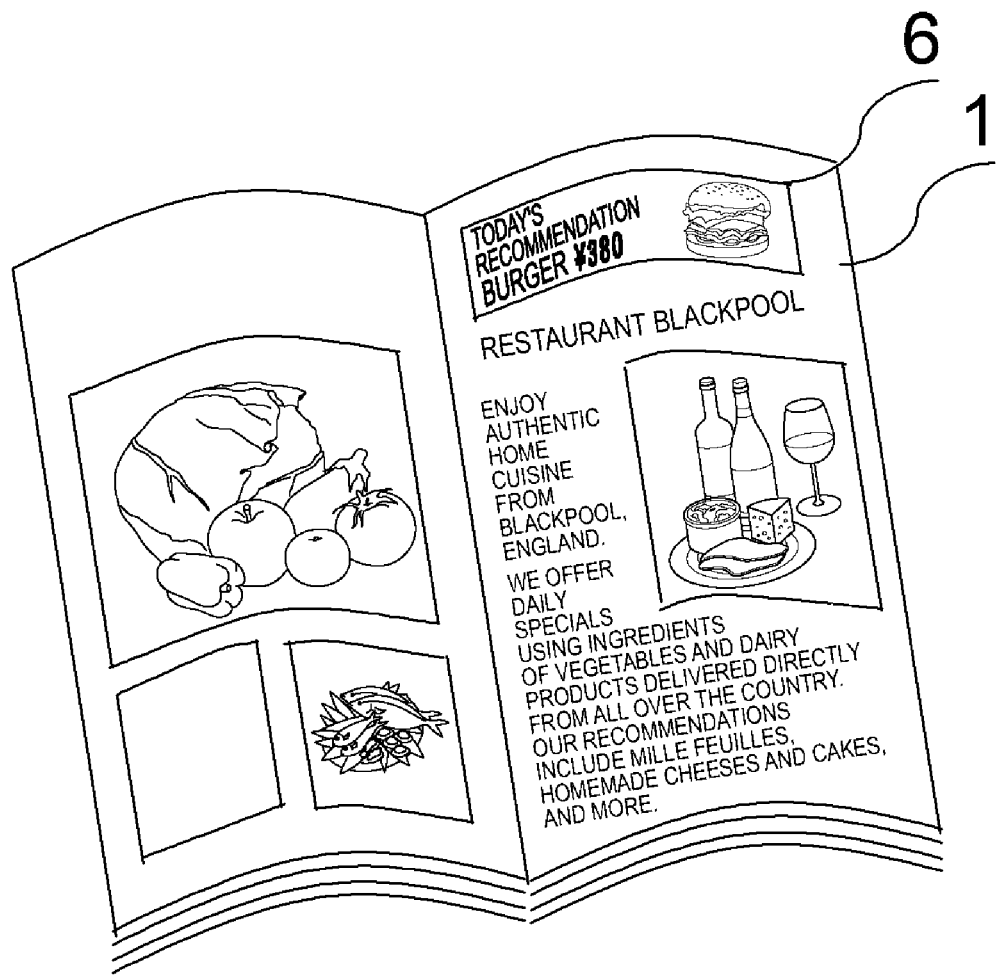
FIG. 7 is a diagram for describing an operational effect according to the present exemplary embodiment.

In the modification example, for example, the relevant information can be projected onto a position that does not get in the way of reading the print content, and desired information can be projected near closely-related information among multiple pieces of information that are included in the print content. For example, in the case of the print content illustrated in FIG. 2, a space is present on the upper side. For this reason, the space can be set to be a projection position. When this is done, as illustrated in FIG. 7, relevant information 6 can be projected without overlapping the print content.

As other modification examples, by using the captured image, the specification unit 14 may specify an angle of elevation of the printed material 1, that is, an angle of elevation of the page surface on which the print content is printed. Calculation of the angle of elevation of the page surface can be realized in accordance with the technology in the related art. Then, the relevant information output unit 15 in the modification example, may adjust at least one among a size, a shape, and a position of the image (image projected onto the printed material 1) in the relevant information 6, based on the position and the angle of the printed material 1, and thus output a result of the adjustment.

In the modification example, even though the angle or position of the printed material 1 varies from user to user, the image in the relevant information 6 can be edited in a manner that is suitable for the varying angle or position and be projected on the printed material 1. For this reason, it is possible to reduce the inconvenience of the relevant information 6 on the printed material 1 being difficult to visually recognize, the inconvenience of the details being not able to be recognized, and so forth.

Figure 6:
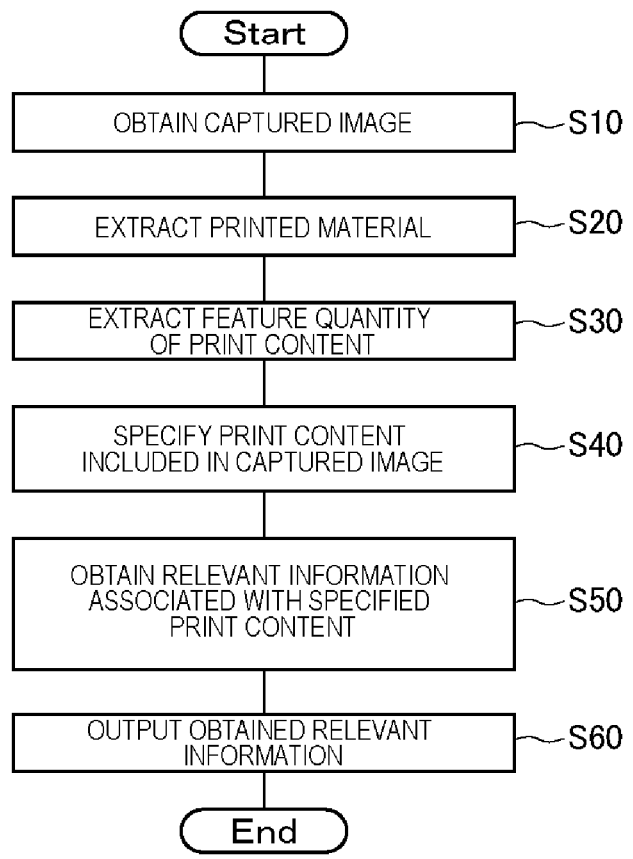
FIG. 6 is a flowchart illustrating one example of a flow of processing in an information provision method according to the present exemplary embodiment.

At this point, referring to a flowchart in FIG. 6, one example of a flow of processing in an information provision method according to the present exemplary embodiment is described.

In the example, the imaging apparatus 2 (refer to FIG. 1) successively images the predetermined area 201. Then, the captured image obtainment unit 13 obtains the captured image captured by the imaging apparatus 2 in real time (S10). Furthermore, S20 to S60 are also executed in real time.

After S10, the specification unit 14 processes the captured image obtained by the captured image obtainment unit 13 for every frame. First, the specification unit 14 extracts the printed material 1 from the captured image for one frame (S20). At this point, if the printed material 1 is not extracted, the specification unit 14 ends processing of the frame and proceeds to the processing of the next frame. That is, S20 is repeatedly executed without proceeding to S30 until the printed material 1 is extracted.

If the printed material 1 is extracted from the captured image, the specification unit 14 extracts the feature quantity of the print content that is printed on the printed material 1 (S30). Then, the extracted feature quantity is checked against the feature quantity (refer to FIG. 4) that is stored in the feature quantity storage unit 11, and the print content ID is specified, which is associated with the feature quantity that is matched to the extracted feature quantity to a constant precision (which is the design matter) (S40). At this point, if the feature quantity that is matched to a constant precision is not stored in the feature quantity storage unit 11, the specification unit 14 ends processing of the frame and proceeds to the processing of the next frame. That is, the processing returns to S20 without proceeding to S50.

Furthermore, if the print content ID that is specified by the specification unit 14 in S40 is consistent with the print content ID that is specified in the processing of another frame immediately before specifying the print content ID, the processing may return to S20 without proceeding to S50.

If in S40, the specification unit 14 specifies the print content ID, thereafter, the relevant information output unit 15 obtains from the relevant information storage unit 12 the relevant information 6 that is associated with the print content ID that is specified in S40 (S50), and outputs the obtained relevant information 6 (S60).

For example, in S40, the specification unit 14 is set to specify the print content ID of the print content as illustrated in FIG. 2. When this is done, the relevant information output unit 15 obtains from the relevant information storage unit 12 the relevant information 6 that is associated with the print content ID and, for example, projects the obtained relevant information 6 onto a predetermined position on the printed material 1. As a result, as illustrated in FIG. 7, the relevant information 6 is projected on the printed material 1, and the user 5 can read the relevant information 6 along with the print content.

While in S10, the captured image obtainment unit 13 continues to obtain the captured image, the processing described above continues. Moreover, until the specification unit 14 specifies the new print content ID in S40, the relevant information output unit 15 may continue to output the relevant information 6 that is associated with the print content ID that is previously specified by the specification unit 14. Then, when the specification unit 14 specifies the new print content ID in S40, the relevant information 6 to be output may be changed to the relevant information 6 that is associated with the newly-specified print content ID.

Figure 8:
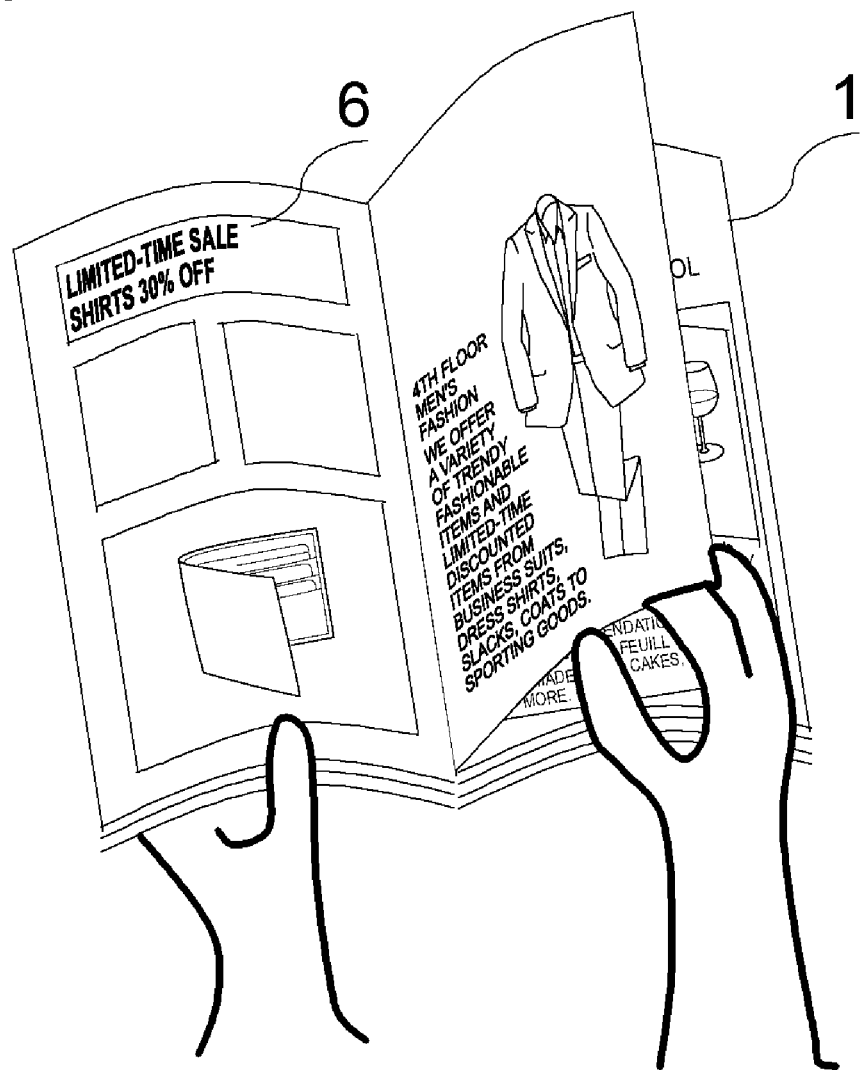
FIG. 8 is a diagram for describing an operational effect according to the present exemplary embodiment.

For example, while the user 5 continues to read the print content in FIG. 7, the print content appears successively on multiple frames (captured images). When the multiple frames are processed, the specification unit 14 continues to specify an ID of the print content in FIG. 7 successively. In this case, the captured image obtainment unit 13 can continue to output the relevant information 6 relating to the print content in FIG. 7. Then, as illustrated in FIG. 8, the user 5 is assumed to perform an operation of turning over the page and changing the print content that he or she reads. When this is done, new print content is imaged by the imaging unit. Subsequently, the print content ID of the new print content is specified by the specification unit 14. Then, the relevant information output unit 15 changes the relevant information 6 to be output to the relevant information 6 that is associated with the new print content ID that is specified by the specification unit 14. As a result, as illustrated in FIG. 8, details of the relevant information 6 to be output are changed.

Next, operational effects according to the present exemplary embodiment are described.

When the print content that the user is reading is imaged and the print content that the user is reading is specified by using the captured image, the information provision apparatus according to the present exemplary embodiment provides the user with the information relating to the specified print content. Until the relevant information is provided to the user, in the meantime, the user may perform only operations of taking hold of the printed material that he or she wants to read by the hand, accessing the desired print content, and reading the print content, and does not need to perform a computer operation and the like in order to obtain the information relating to the print content.

Furthermore, when the user changes the print content that he or she reads, such as when a page is turned over, or when the front and back sides of the printed material are turned over, the information provision apparatus according to the present exemplary embodiment can detect that the print content that he or she is reading has changed and can provide the user with new information relating to the print content that is newly read.

In this manner, according to the present exemplary embodiment, it is possible that predetermined information is provided to the user without requesting the user to perform a computer operation and the like in order to obtain the predetermined information. That is, the user neither needs to learn an operation method in advance nor consider the method on the spot in order to obtain the predetermined information. Furthermore, there is neither a need to prepare an explanation of the operation method and the like for the user within the predetermined area 201 or in the neighborhood of the predetermined area 201, nor a need to station an attendant who provides an explanation of the operation method.

Furthermore, the information that is provided to the user is information relating to the print content that the user is reading at that time. There is a very high likelihood that the information will be information that the user actually desires at that time. According to the present exemplary embodiment, the information that the user actually desires at that time can be provided in real time. According to the present exemplary embodiment, it can be expected that a high advertisement effect would be accomplished.

For example, if the information provision apparatus according to the present exemplary embodiment is installed in a large-scale commercial facility, when the user is reading a print content, such as a guide for a location of a movie theater or a movie that is currently being shown, a trailer of a newly-released movie and the like can be provided as the relevant information. Furthermore, if the user is reading the print content such as a guide for a restaurant floor, a photograph of a seasonal recommended dish, ranking information on popular restaurants on the restaurant floor, a relatively cheap lunch menu or the like can be provided as the relevant information. Furthermore, if the user is reading a print content such as a guide for an apparel floor, today's on-sale information or popular brand information can be provided as the relevant information.

Generally, lead time for updating the information is long because content creation or printing and arranging are necessary for a single printed paper material. Furthermore, content that appeals to a visual sense, such as a moving image, cannot be distributed. According to the present exemplary embodiment, the information provision apparatus is realized in which a combination of high readability or affinity of the printed material to the user and high real-time availability of projection information is possible.

Furthermore, according to the present exemplary embodiment, there is an advantage that privacy is protected because face authentication or personal information registration is unnecessary.

Moreover, according to the present exemplary embodiment, because the print content that the user is reading is specified by using the feature quantity of the printed content, there is no need to print a marker and the like on the printed material for identifying the print content (page and the like). That is, there is no need to provide a space for the marker and the like on the printed material. For this reason, only the information that the user essentially desires, such as photograph or text information, can be printed on the printed material. Furthermore, there is an advantage that content of an existing printed material on which the marker and the like are not printed can be supported, and that time and effort to newly re-create the content is unnecessary. However, if multiple pages have a page configuration (in terms of used color or arrangement) such that they are exceedingly similar to one another, because recognition precision is lower, it is desirable that the decrease in the recognition precision be dealt with by changing a configuration on the paper surface.

Furthermore, if a configuration is provided in which the relevant information is projected onto the printed material, because there is no need to newly provide a screen or a display, even in the case of a high-quality apparel store, a high-class restaurant, or the like where the external appearance or atmosphere is considered as being important, the information can be provided to the user according to the present exemplary embodiment without destroying the atmosphere of such a place.

Second Exemplary Embodiment

An information provision apparatus according to the present exemplary embodiment is different from that according to the first exemplary embodiment in that based on the configuration of the information provision apparatus according to the first exemplary embodiment, the information provision apparatus according to the present exemplary embodiment further includes a unit that identifies each one of multiple printed materials and an analyzing unit that analyzes a behavior pattern of the user. Furthermore, the information provision apparatus according to the present exemplary embodiment may further include a transmission unit that transmits a result of the analysis to an external apparatus.

What distinguishes the information provision apparatus according to the present exemplary embodiment from that according to the first exemplary embodiment is described below. At this point, a description of the same configuration as that according to the first exemplary embodiment is not repeated.

Figure 9:
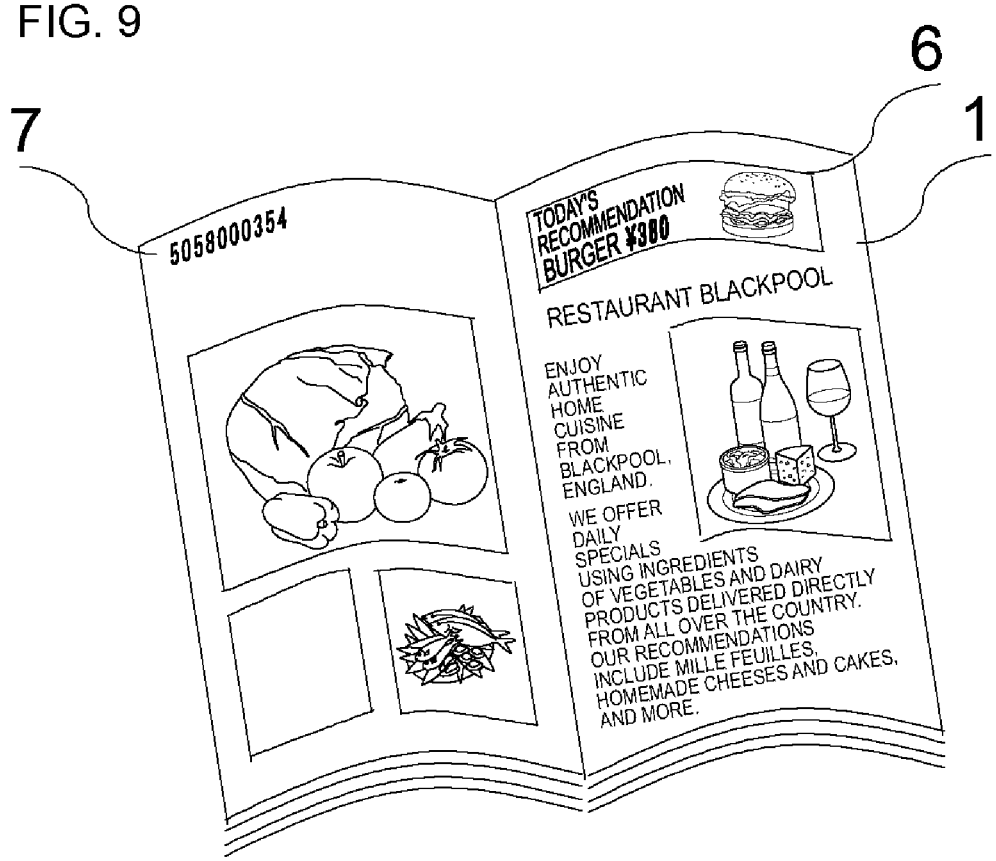
FIG. 9 is a diagram for describing an operational effect according to the present exemplary embodiment.

According to the present exemplary embodiment, identification information by which each one of the multiple printed materials 1 can be identified is printed on each one of the multiple printed materials 1 on each one of which the same print content is printed. No special limitation is imposed on the identification information. The identification information can be set to be a character string, a QR code (a registered trademark), a barcode, an AR tag, and the like. One example is illustrated in FIG. 9. In the case of the illustrated example, identification information 7, which is composed of a character string, is printed on the printed material 1 along with the print content.

The specification unit 14 according to the present exemplary embodiment is configured in such a way as to read the identification information 7 that is included in the captured image that is obtained by the captured image obtainment unit 13. The specification unit 14 is configured to include a reader according to the type of the identification information 7.

An analysis unit stores the result (the printed content ID, the identification information 7, and the like) that is specified by the specification unit 14 with the result being associated with a point in time at which the imaging unit images the print content. Then, the behavior pattern of the user 5 who reads the printed material 1 is analyzed by using the pieces of information that are stored. For example, if the printed material 1 has multiple pages and as illustrated in FIG. 10, information with which the page of the printed material 1 is associated for every print content ID is stored in the feature quantity storage unit 11, it can be understood, by using such information, in which order the user 5 reads the multiple pages. Furthermore, the time that each page takes to be read can be calculated, and it can be understood which page takes a long time to be read. Then, it can be understood, by using these results, which page the user 5 is interested in.

The transmission unit transmits the result of the analysis by the analysis unit to an external apparatus over a network such as the Internet, an LAN, a WAN and the like.

According to the present exemplary embodiment, when each one of the printed materials 1 can be uniquely identified, a line along which the user 5 who holds the printed material 1 moves can be detected, and it is possible to provide a consistent service.

For example, the information provision apparatus 10 according to the present exemplary embodiment may be provided at multiple locations within a large-scale commercial facility. In this case, as a usage example, it is assumed that the user 5 takes hold of one printed material 1 first with the hand, then moves inside the large-scale commercial facility while holding the one printed material 1, and reads the printed material 1 at various locations and thus obtains the relevant information 6. For example, if the information provision apparatus 10 according to the present exemplary embodiment is used, a time series behavioral pattern (moving locus and the like) of the user 5 who possesses the printed material 1 can be specified by keeping track of the printed material 1 that is identified with the identification information 7, with one printed material 1 as one unit.

Moreover, a store into which the user 5 enters can be specified by providing the information provision apparatus 10 according to the present exemplary embodiment also within the store. In this case, after a coupon is provided as the relevant information 6, it is possible to check whether or not the user 5 enters the store, and based on a result of the checking, it is possible to determine an effect (a coupon effect and the like) of the relevant information 6.

Third Exemplary Embodiment

Based on the configurations of the information provision apparatuses according to the first and second exemplary embodiments, an information provision apparatus according to a third exemplary embodiment is newly configured as follows. A configuration of the information provision apparatus according to the present exemplary embodiment is described below.

Figure 11:
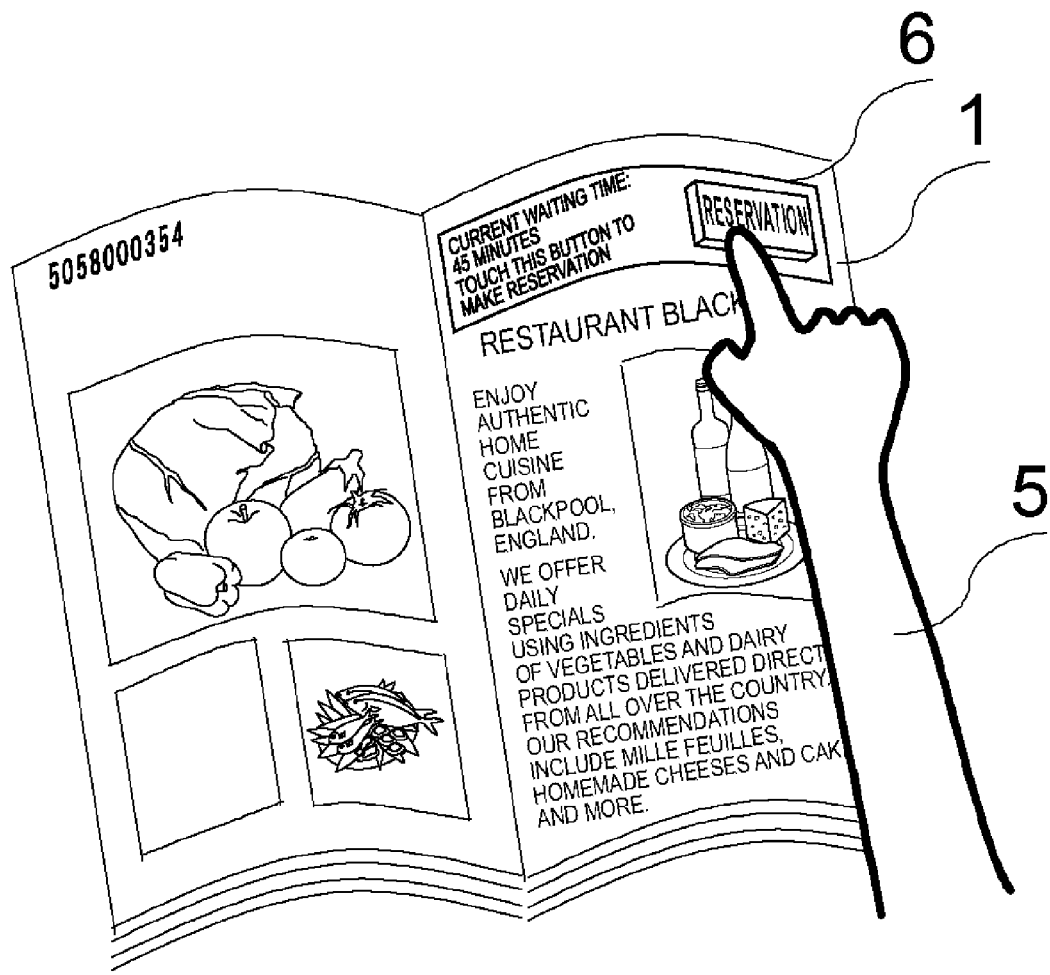
FIG. 11 is a diagram for describing an operational effect according to the present exemplary embodiment.
Figure 12:
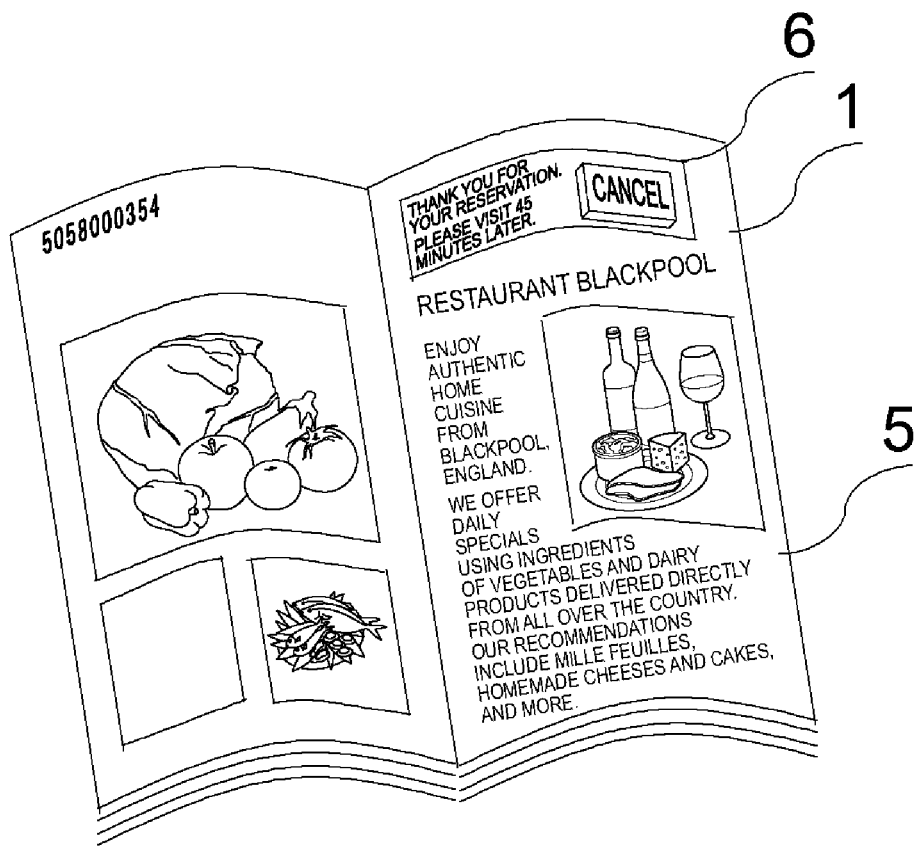
FIG. 12 is a diagram for describing an operational effect according to the present exemplary embodiment.

The relevant information output unit 15 according to the present exemplary embodiment, as illustrated in FIGS. 11 and 12, projects the relevant information 6 onto the printed material 1. Then, images (input images) that can be selectively input by the user 5 are included in the relevant information 6 that is projected.

The imaging unit according to the present exemplary embodiment is configured to include a depth camera that reads a three-dimensional shape. Then, the specification unit 14 is configured in such a way that a shape of the hand of the user 5 is recognized and thus a touch of the hand of the user 5 on the page surface can be detected. That is, the specification unit 14 is configured in such a way that the touch of the user 5 on the input image can be detected.

A method of detecting the touch of the hand using a depth camera is disclosed in Non-Patent Document, Kinectfusion: real-time dynamic 3d surface reconstruction and interaction S Izadi, R A Newcombe, D Kim, O Hilliges . . . —ACM SIGGRAPH 2011, and the like.

For example, a waiting time at the restaurant or price information for the restaurant and an input image (reservation button) for reservation are displayed as the relevant information 6 on the print content that introduces a certain restaurant as illustrated in FIG. 11. Moreover, timely information such as the waiting time at the restaurant can be provided as the relevant information 6 by achieving a configuration in which the information provision apparatus 10 according to the present exemplary embodiment is connected to a network and the relevant information 6 that is stored in the relevant information storage unit 12 can be updated.

Then, when the specification unit 14 detects that the user 5 touches the input image (reservation button) for reservation, the transmission unit transmits information (reservation application information) to the effect that the input image is touched for reservation, to a restaurant that is introduced using the print content, along with the identification information 7 of the printed material 1. For example, a transmission address (a computer or POS and the like at each store) to which reservation information and the like is transmitted may be stored in the feature quantity storage unit 11 with the transmission address being associated with each one of the print content IDs. Then, the transmission unit may transmit predetermined information (the reservation application information, the identification information 7 of the printed material 1, and the like) to a predetermined computer or POS by using the transmission address.

According to the present exemplary embodiment, interactive services, such as seat reservation, commodity purchase reservation, and queuing, can be realized by using the identification information 7 by which each one of the printed materials 1 can be identified.

Moreover, in the relevant information 6 illustrated in FIG. 11, when it is detected that the user 5 touches the input image (reservation button) for reservation (the specification unit 14) and the transmission of the reservation information to a predetermined transmission address is ended (the transmission unit), the relevant information output unit 15, as illustrated in FIG. 12, may change the details of the relevant information 6 to be output. In FIG. 12, in addition to text information indicating that the reservation is completed, an input image (cancellation button) through which the user 5 can cancel the reservation is displayed.

When the user 5 arrives at the reserved restaurant, the user 5 can be identified and can be guided toward the reserved seat by checking the identification information 7 that is printed on the printed material 1 held by the user 5 against the identification information 7 that is received by the POS and the like. In this manner, a service to the user 5 can be improved, and customer satisfaction can be enhanced by integrating a touch detection unit into the printed material 1.

<<Supplementary Note>>

According to the description provided above, inventions are described as follows.

<Invention 1>

An information provision apparatus including: a feature quantity storage unit in which a feature quantity of print content that is printed on a printed material is stored; a relevant information storage unit in which relevant information that is associated with the print content is stored; a captured image obtainment unit that obtains a captured image that is captured by an imaging unit; a specification unit that specifies the print content that is included in the captured image by using the feature quantity of the print content; and a relevant information output unit that obtains from the relevant information storage unit the relevant information that is associated with the print content that is specified by the specification unit and outputs the obtained relevant information.

<Invention 2>

The information provision apparatus according to Invention 1, in which the specification unit specifies a position of the printed material by using the captured image, and in which the relevant information output unit includes a projector and projects the relevant information onto the printed material.

<Invention 3>

The information provision apparatus according to Invention 2, in which projection positional information indicating a position on the printed material onto which the relevant information is projected is stored, for every piece of relevant information, in the relevant information storage unit, and in which the relevant information output unit projects the relevant information onto the position on the printed material that is specified with the projection positional information.

<Invention 4>

The information provision apparatus according to Invention 2 or 3, in which the specification unit further specifies an angle of the printed material by using the captured image, and in which based on the position and the angle of the printed material, the relevant information output unit adjusts at least one among a size, a shape, and a position of an image on which the relevant information is displayed, and thus outputs the image with at least the one among the size, the shape, and the position being adjusted.

<Invention 5>

The information provision apparatus according to any one of Inventions 1 to 4, in which multiple feature quantities of the print content that is printed on the printed material which includes multiple pages are stored in the feature quantity amount storage unit in a unit of one page or in a unit of two facing pages.

<Invention 6>

The information provision apparatus according to any one of Inventions 1 to 5, in which identification information by which each one of multiple printed materials can be identified is printed on each one of the multiple printed materials on each one of which the same print content is printed, and in which the specification unit reads the identification information that is included in the captured image.

<Invention 7>

The information provision apparatus according to Invention 6, further including an analysis unit that stores a result that is specified by the specification unit with the result being associated with a point in time at which the imaging unit images the print content, and analyzes a behavioral pattern of a user who reads the printed material by using the stored pieces of information.

<Invention 8>

The information provision apparatus according to Invention 7, further including a transmission unit that transmits a result of the analysis by the analysis unit to an external apparatus.

<Invention 9>

A program for causing a computer to serve as: a feature quantity storage unit in which a feature quantity of print content that is printed on a printed material is stored; a relevant information storage unit in which relevant information that is associated with the print content is stored; a captured image obtainment unit that obtains a captured image that is captured by an imaging unit; a specification unit that specifies the print content that is included in the captured image by using the feature quantity of the print content; and a relevant information output unit that obtains from the relevant information storage unit the relevant information that is associated with the print content that is specified by the specification unit and outputs the obtained relevant information.

<Invention 9-2>

The program according to Invention 9, causing the specification unit to specify a position of the printed material by using the captured image, and causing the relevant information output unit to control a projector and project the relevant information onto the printed material.

<Invention 9-3>

The program according to Invention 9-2, causing projection positional information indicating a position on the printed material onto which the relevant information is projected to be stored, for every piece of relevant information, in the relevant information storage unit, and causing the relevant information output unit to project the relevant information onto the position on the printed material that is specified with the projection positional information.

<Invention 9-4>

The program according to Invention 9-2 or 9-3, causing the specification unit to further specify an angle of the printed material by using the captured image, and causing the relevant information output unit to adjust and thus output at least one among a size, a shape, and a position of an image on which the relevant information is displayed, based on the position and the angle of the printed material.

<Invention 9-5>

The program according to any one of Inventions 9 to 9-4, causing the multiple feature quantities of the print content, which are printed on the printed material which includes multiple pages, to be stored in the feature quantity amount storage unit in a unit of one page or in a unit of two facing pages.

<Invention 9-6>

The program according to any one of Inventions 9 to 9-5, causing identification information, by which each one of the multiple printed materials can be identified, to be printed on each one of the multiple printed materials on each one of which the same print content is printed, and causing the specification unit to read the identification information that is included in the captured image.

<Invention 9-7>

The program according to Invention 9-6, causing the computer to serve as an analysis unit that stores a result that is specified by the specification unit with the result being associated with a point in time at which the imaging unit images the print content, and analyzes a behavioral pattern of a user who reads the printed material by using the stored pieces of information.

<Invention 9-8>

The program according to Invention 9-7, causing the computer to serve as a transmission unit that transmits a result of the analysis by the analysis unit to an external apparatus.

<Invention 10>

An information provision method of causing a computer to execute processing including: a captured image obtainment step of obtaining a captured image that is captured by an imaging unit; a specification step of specifying print content that is included in the captured image by using a feature quantity of the print content that is printed on a printed material that is stored in a feature quantity storage unit; and a relevant information output step of referring to a relevant information storage unit in which relevant information that is associated with the print content is stored, obtaining from the relevant information storage unit the relevant information that is associated with the print content which is specified in the specification step, and thus outputting the obtained relevant information.

<Invention 10-2>

The information provision method according to Invention 10, in which in the specification step, a position of the printed material is specified by using the captured image, and in which in the relevant information output step, the relevant information is projected onto the printed material using the projector.

<Invention 10-3>

The information provision method according to Invention 10-2, in which projection positional information indicating a position on the printed material onto which the relevant information is projected is stored, for every piece of relevant information, in the relevant information storage unit, and in which in the relevant information output step, the relevant information is projected onto the position on the printed material that is specified with the projection positional information.

<Invention 10-4>

The information provision method according to Invention 10-2 or 10-3, in which in the specification step, an angle of the printed material is further specified by using the captured image, and in which in the relevant information output step, at least one among a size, a shape, and a position of an image on which the relevant information is displayed is adjusted and thus is output based on the position and the angle of the printed material.

<Invention 10-5>

The information provision method according to any one of Inventions 10 to 10-4, in which multiple feature quantities of the print content that is printed on the printed material which includes multiple pages are stored in the feature quantity amount storage unit in a unit of one page or in a unit of two facing pages.

<Invention 10-6>

The information provision method according to any one of Inventions 10 to 10-5, in which identification information by which each one of multiple printed materials can be identified is printed on each one of the multiple printed materials on each one of which the same print content is printed, and in which in the specification step, the identification information that is included in the captured image is read.

<Invention 10-7>

The information provision method according to Invention 10-6, causing the computer to further execute an analysis step of accumulating a result that is specified in the specification step with the result being associated with a point in time at which the print content is imaged in the imaging step, and analyzing a behavioral pattern of a user who reads the printed material by using the stored pieces of information.

<Invention 10-8>

The information provision method according to Invention 10-7, causing the computer to further execute a transmission step of transmitting a result of the analysis obtained in the analysis step to an external apparatus.

This application claims the benefit of an earlier filing date and right of priority to Japanese Patent Application No. 2012-180208, filed on Aug. 15, 2012, the contents of which are incorporated by reference herein in their entirety.

What is claimed is:

1. An information provision apparatus comprising:
a feature quantity storage unit, implemented at least by hardware including a CPU and memory, in which a feature quantity of each of a plurality of pieces of print content that is printed on a brochure is stored;
a relevant information storage unit, implemented at least by the hardware, in which each of a plurality of pieces of relevant information is stored in association with each of the plurality of pieces of print content;
a captured image obtainment unit, implemented at least by the hardware, that obtains a captured image that is captured by an imaging unit;
a specification unit, implemented at least by the hardware, that searches the captured image with the feature quantity of each of the plurality of pieces of print content as a key and extracts a piece of the print content from the captured image;
a relevant information output unit, implemented at least by the hardware, that obtains from the relevant information storage unit a piece of the relevant information that is associated with the piece of print content that is extracted by the specification unit and projects the obtained piece of relevant information onto the brochure,
wherein the print content includes a guide, and the relevant information includes another guide,
wherein identification information by which multiple brochures having the same print content are distinguishable from each other is printed on each one of the multiple brochures, and the specification unit reads the identification information that is included in the captured image,
wherein while the relevant information output unit is projecting the obtained piece of relevant information, the captured image obtainment unit obtains a second captured image of the brochure, and the specification unit determines that a user has touched the brochure where a specific portion of the obtained piece of relevant information is being projected;
a transmission unit, implemented at least by the hardware, that, responsive to the specification unit determining that the user has touched the brochure where the specific portion of the obtained piece of relevant information is being projected, transmits a transmission address associated with the brochure and indication that the user has touched the brochure where the specific portion of the obtained piece of relevant information is being projected.

2. The information provision apparatus according to claim 1,
wherein the specification unit specifies a position of the brochure by using the captured image, and
wherein the relevant information output unit includes a projector and projects the relevant information onto the brochure.

3. The information provision apparatus according to claim 2,
wherein projection positional information indicating a position on the brochure onto which the relevant information is projected is stored, for every piece of relevant information, in the relevant information storage unit, and
wherein the relevant information output unit projects the relevant information onto the position on the brochure that is specified with the projection positional information.

4. The information provision apparatus according to claim 2,
wherein the specification unit further specifies an angle of the brochure by using the captured image, and
wherein based on the position and the angle of the brochure, the relevant information output unit adjusts at least one among a size, a shape, and a position of an image on which the relevant information is displayed, and thus outputs the image with at least the one among the size, the shape, and the position being adjusted.

5. The information provision apparatus according to claim 1,
wherein multiple feature quantities of the print content that is printed on the brochure which includes multiple pages are stored in the feature quantity amount storage unit in a unit of one page or in a unit of two facing pages.

6. The information provision apparatus according to claim 1, further comprising:
an analysis unit, implemented at least by the hardware, that stores a result that is specified by the specification unit with the result being associated with a point in time at which the imaging unit images the print content, and analyzes a behavioral pattern of a user who reads the brochure by using the stored result of information.

7. The information provision apparatus according to claim 6,
wherein the transmission unit transmits the result of the analysis by the analysis unit to an external apparatus.

8. The information provision apparatus according to claim 1, wherein the print content includes a guide of a facility.

9. The information provision apparatus according to claim 1, wherein the print content includes a guide of a facility in which the brochure is disposed.

10. A non-transitory storage medium storing a program executable by a computer to:
a store a feature quantity of each of a plurality of pieces of print content that is printed on a brochure;
store each of a plurality of pieces of relevant information that is associated with the print content in association with each of the plurality of pieces of print content;
obtain a captured image that is captured by an imaging unit;
search the captured image with the feature quantity of each of the plurality of pieces of print content as a key and extract a piece of the print content from the captured image;
obtain a piece of the relevant information that is associated with the piece of print content that is extracted and project the obtained piece of relevant information onto the brochure,
wherein the print content includes a guide, and the relevant information includes another guide,
wherein identification information by which multiple brochures having the same print content are distinguishable from each other is printed on each one of the multiple brochures, and the identification information that is read and that is included in the captured image,
wherein while the obtained piece of relevant information is being projected, a second captured image of the brochure is captured, and that a user has touched the brochure where a specific portion of the obtained piece of relevant information is being projected is determined; and
transmit, responsive to determination that the user has touched the brochure where the specific portion of the obtained piece of relevant information is being projected, a transmission address associated with the brochure and indication that the user has touched the brochure where the specific portion of the obtained piece of relevant information is being projected.

11. An information provision method comprising:
obtaining a captured image that is captured by an imaging unit, the captured image of a plurality of pieces of print content, each piece having a feature quantity and a piece of relevant information;
searching the captured image with the feature quantity of each of the plurality of pieces of the print content as a key and extracts a piece of the print content from the captured image;
obtaining the piece of the relevant information that is associated with the piece of print content that is extracted and projects the obtained information onto a brochure on which the print content is printed,
wherein the print content includes a guide, and the relevant information includes another guide,
wherein identification information by which multiple brochures having the same print content are distinguishable from each other is printed on each one of the multiple brochures, and the identification information that is read and that is included in the captured image,
wherein while the obtained piece of relevant information is being projected, a second captured image of the brochure is captured, and that a user has touched the brochure where a specific portion of the obtained piece of relevant information is being projected is determined; and
transmit, responsive to determination that the user has touched the brochure where the specific portion of the obtained piece of relevant information is being projected, a transmission address associated with the brochure and indication that the user has touched the brochure where the specific portion of the obtained piece of relevant information is being projected.

* * * * *